United States Patent
Kim et al.

(10) Patent No.: US 11,929,807 B2
(45) Date of Patent: Mar. 12, 2024

(54) METHOD FOR TRANSMITTING AND RECEIVING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Hyungtae Kim, Seoul (KR); Haewook Park, Seoul (KR); Jiwon Kang, Seoul (KR)

(73) Assignee: LG ELECTRONICS INC. (KR)

( * ) Notice: Subject to any disclaimer, the term of this patent is extended or adjusted under 35 U.S.C. 154(b) by 271 days.

(21) Appl. No.: 17/266,992

(22) PCT Filed: Aug. 8, 2019

(86) PCT No.: PCT/KR2019/009965
§ 371 (c)(1),
(2) Date: Feb. 8, 2021

(87) PCT Pub. No.: WO2020/032617
PCT Pub. Date: Feb. 13, 2020

(65) Prior Publication Data
US 2021/0314046 A1    Oct. 7, 2021

(30) Foreign Application Priority Data
Aug. 8, 2018    (KR) .......................... 10-2018-0092564

(51) Int. Cl.
*H04B 7/06*    (2006.01)
*H04B 7/0456*    (2017.01)
(Continued)

(52) U.S. Cl.
CPC .......... *H04B 7/0626* (2013.01); *H04B 7/0456* (2013.01); *H04L 5/0053* (2013.01); *H04W 72/21* (2023.01)

(58) Field of Classification Search
CPC ... H04B 7/0626; H04B 7/0456; H04B 7/0639
See application file for complete search history.

(56) References Cited

U.S. PATENT DOCUMENTS

2014/0211731 A1* 7/2014 Inoue .................... H04W 16/28
370/329
2014/0226746 A1* 8/2014 Ko ....................... H04B 7/0645
375/267

(Continued)

FOREIGN PATENT DOCUMENTS

KR    1020180039181    4/2018
KR    1020180042858    4/2018

(Continued)

OTHER PUBLICATIONS

RP-180892, Huawei et al., "Motivation for NR Multi-TRP and MIMO enhancements", 3GPP TSG RAN Meeting #80, Jun. 2018 (Year: 2018).*

(Continued)

*Primary Examiner* — Natasha W Cosme
*Assistant Examiner* — Yewon Kim
(74) *Attorney, Agent, or Firm* — LEE, HONG, DEGERMAN, KANG & WAIMEY

(57) ABSTRACT

The present invention relates to a method for transmitting and receiving channel state information in a wireless communication system. A method for transmitting channel state information (CSI) by a terminal via a plurality of physical uplink control channels (PUCCHs) in a wireless communication system may comprise the steps of: receiving, from a base station, configuration information related to a CSI report; transmitting first CSI information to the base station (Continued)

via a first PUCCH resource; and transmitting second CSI information to the base station via a second PUCCH resource.

14 Claims, 9 Drawing Sheets

(51) Int. Cl.
*H04L 5/00* (2006.01)
*H04W 72/21* (2023.01)

(56) References Cited

U.S. PATENT DOCUMENTS

| | | | | |
|---|---|---|---|---|
| 2018/0138950 A1* | 5/2018 | Rahman | ............... | H04B 7/0626 |
| 2018/0212661 A1* | 7/2018 | Liu | ..................... | H04B 7/0689 |
| 2020/0059282 A1* | 2/2020 | Wu | ..................... | H04B 7/0413 |
| 2021/0367647 A1* | 11/2021 | Wu | ..................... | H04B 7/0626 |

FOREIGN PATENT DOCUMENTS

| | | |
|---|---|---|
| WO | 2018103741 | 6/2018 |
| WO | 2018128376 | 7/2018 |

OTHER PUBLICATIONS

PCT International Application No. PCT/KR2019/009965, International Search Report dated Dec. 12, 2019, 4 pages.
Huawei, HiSilicon, "Motivation for NR Multi-TRP and MIMO enhancements," 3GPP TSG-RAN #80, RP-180892, Jun. 2018, 5 pages.

* cited by examiner

【FIG. 1】
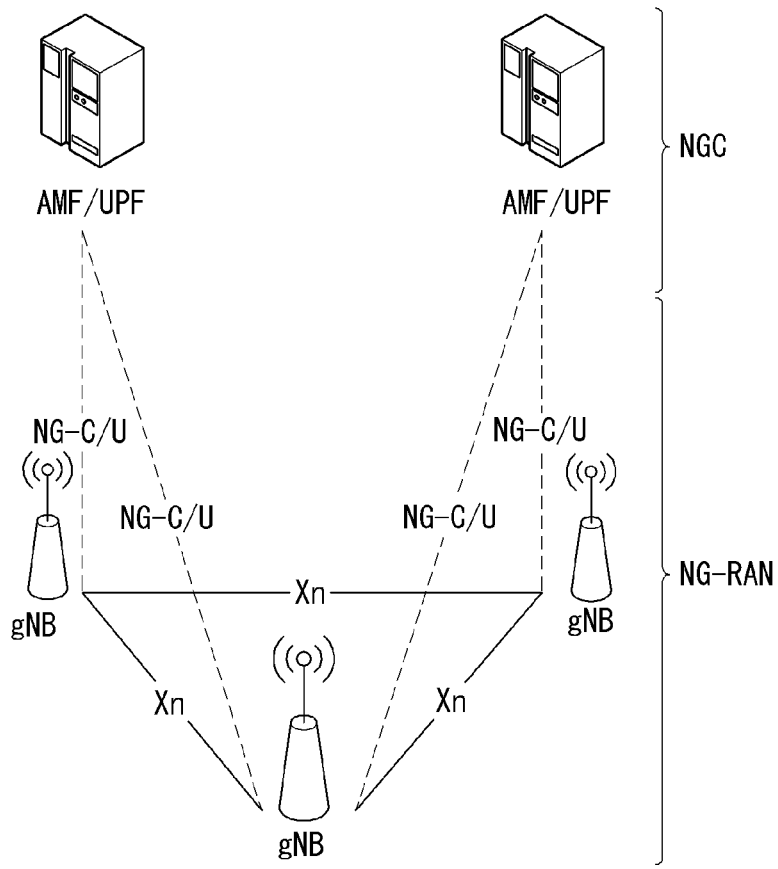
【FIG. 2】
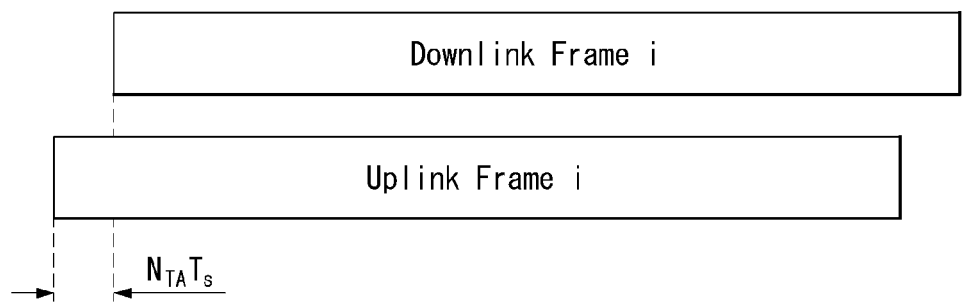

[FIG. 3]
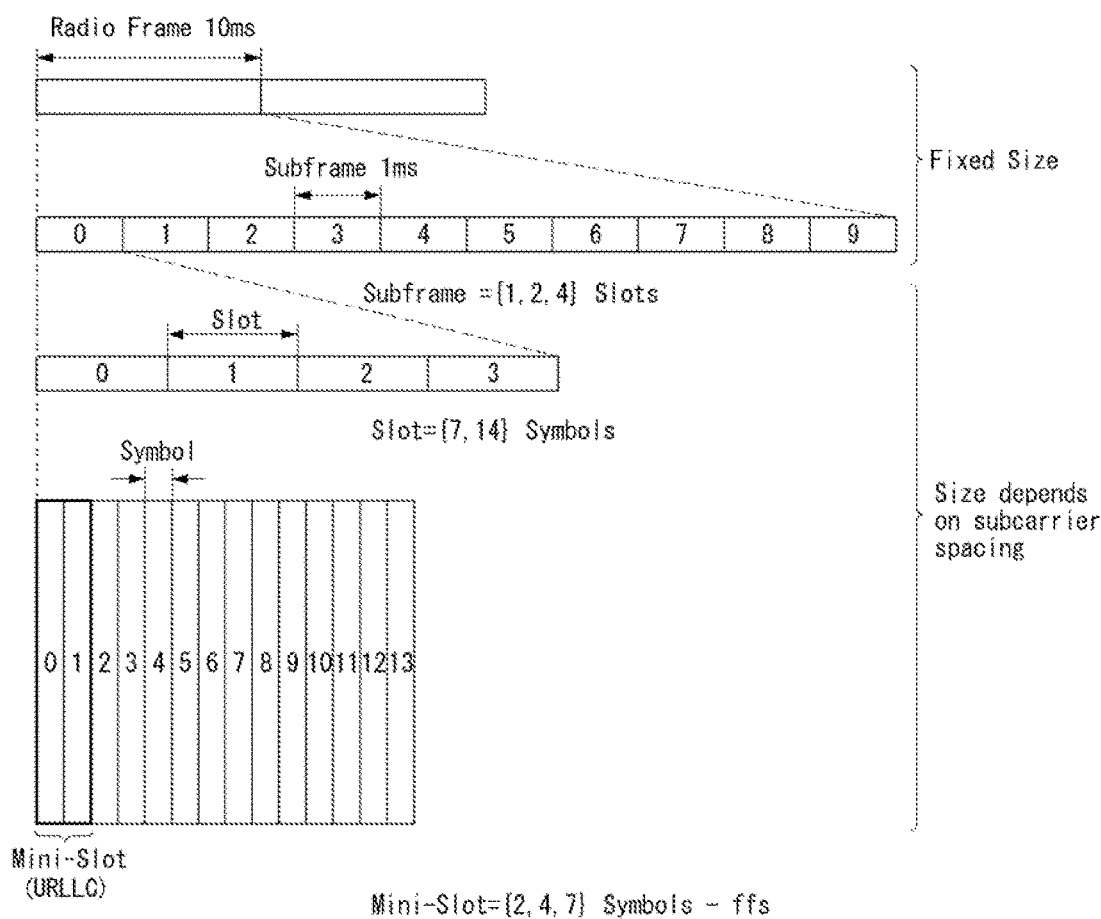

[FIG. 4]
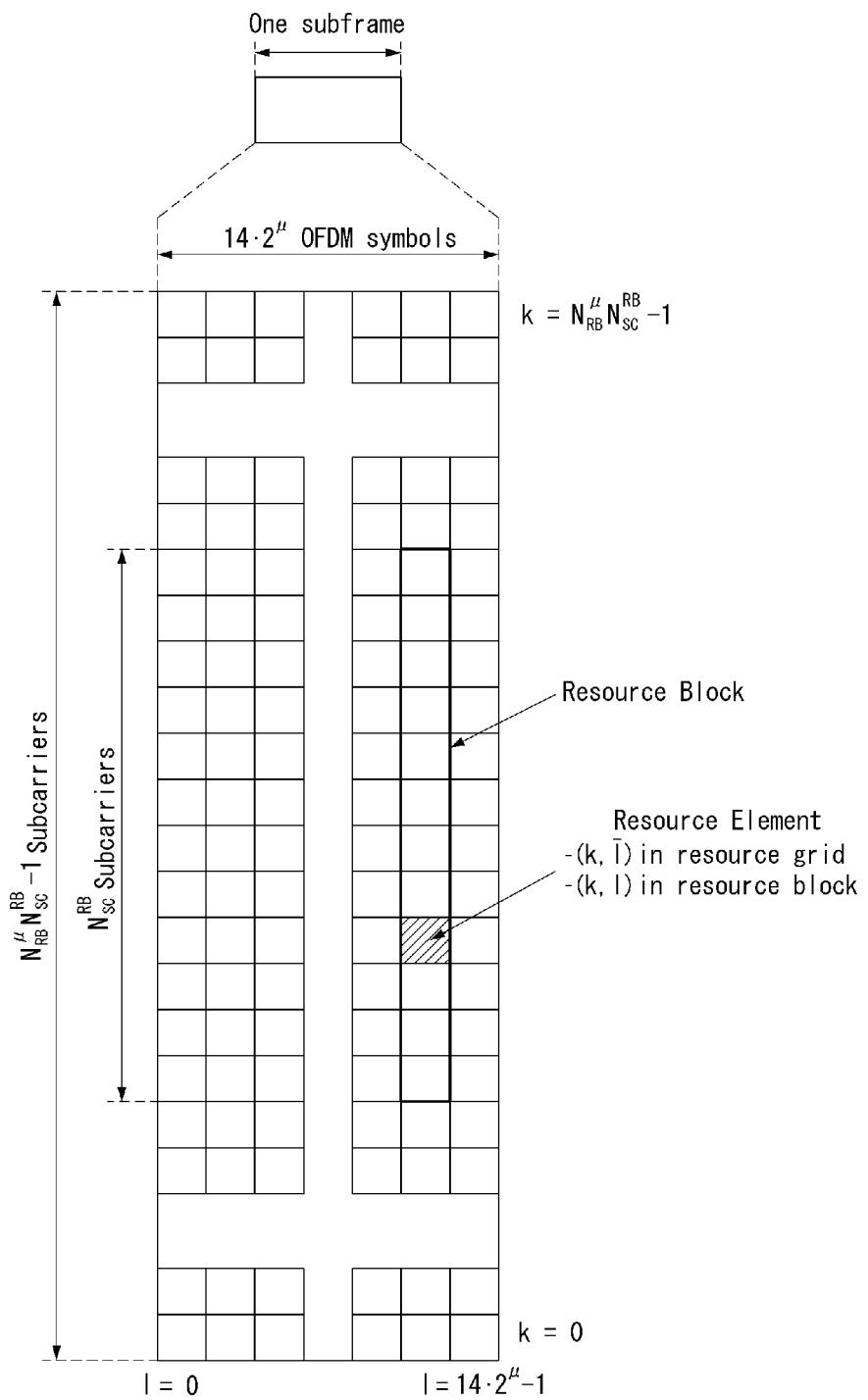

【FIG. 5】
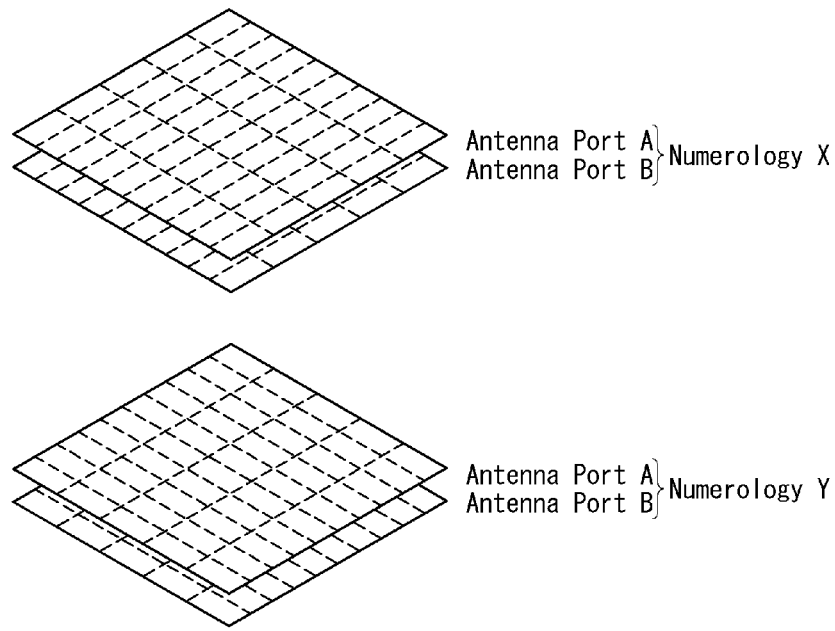
【FIG. 6】
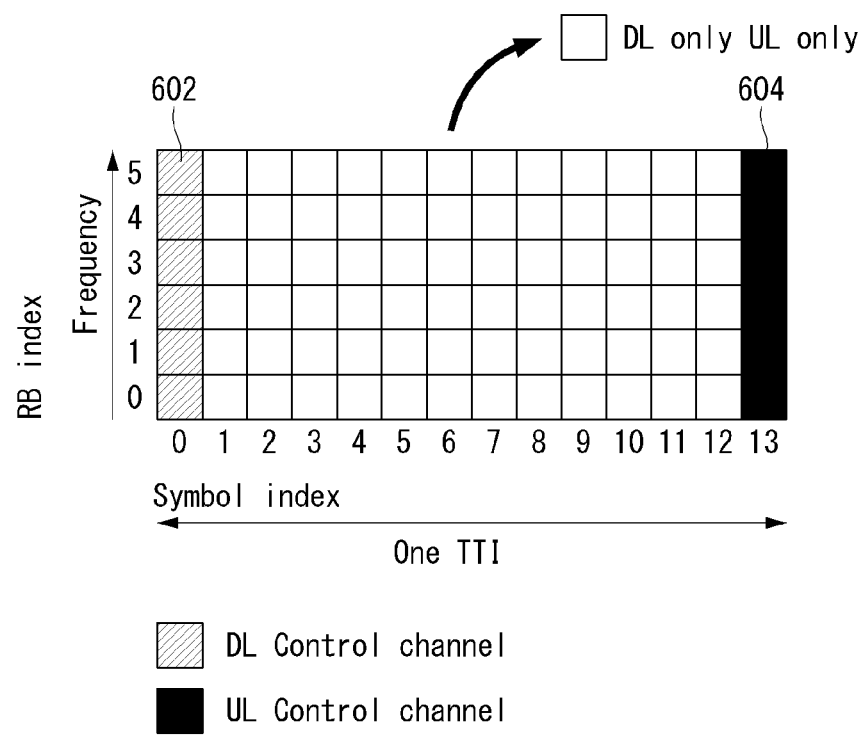

【FIG. 7】
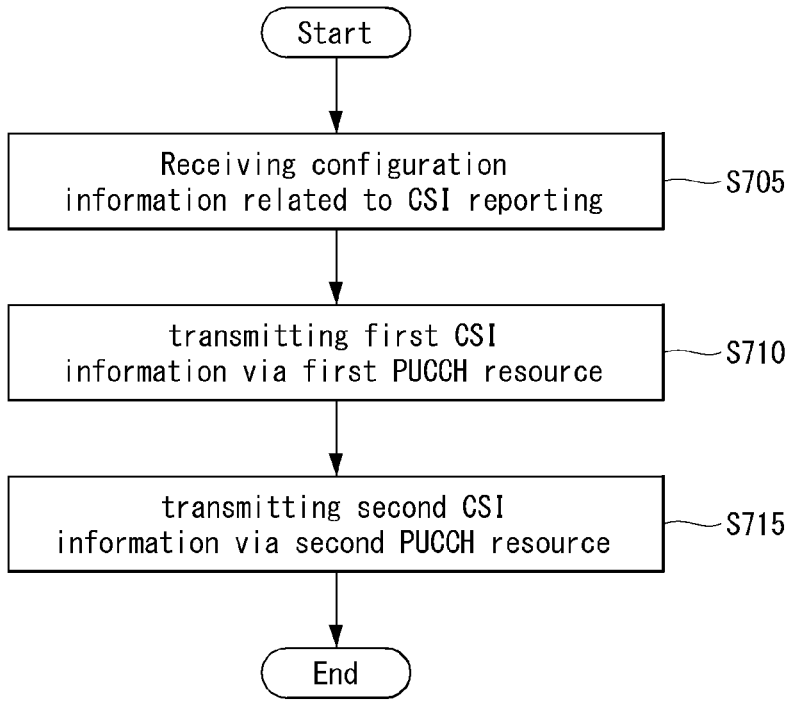
【FIG. 8】
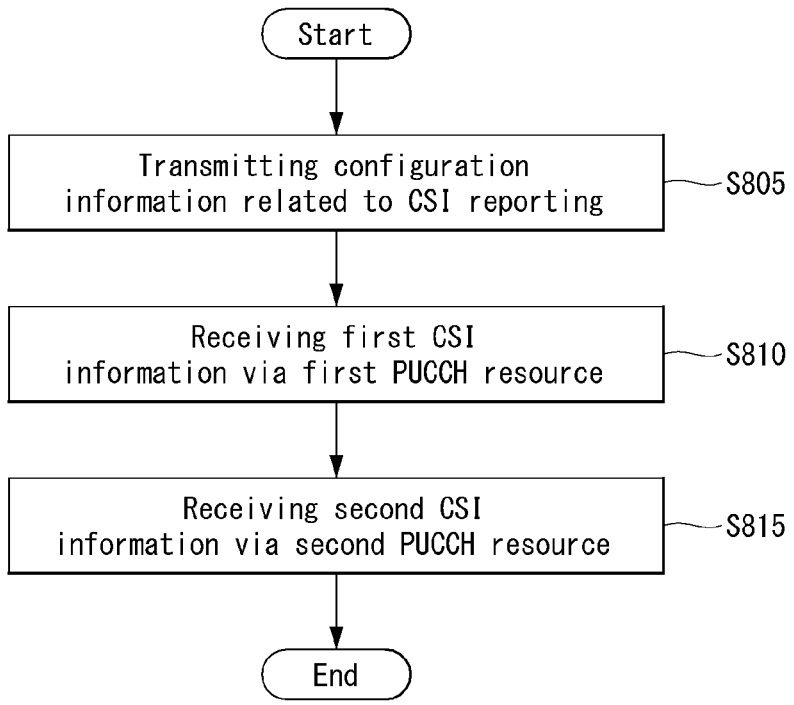

[FIG. 9]
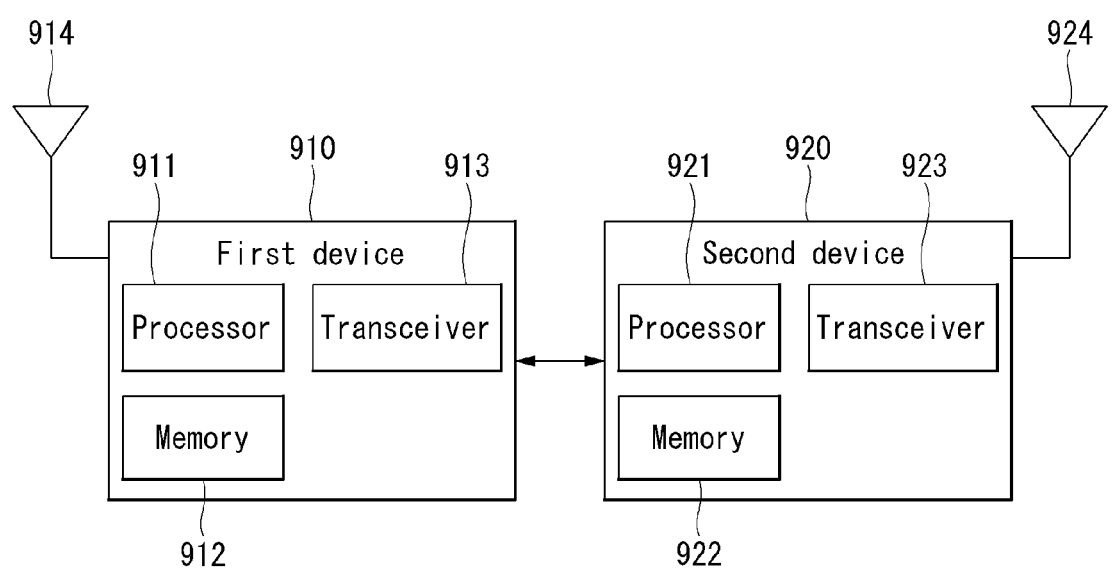

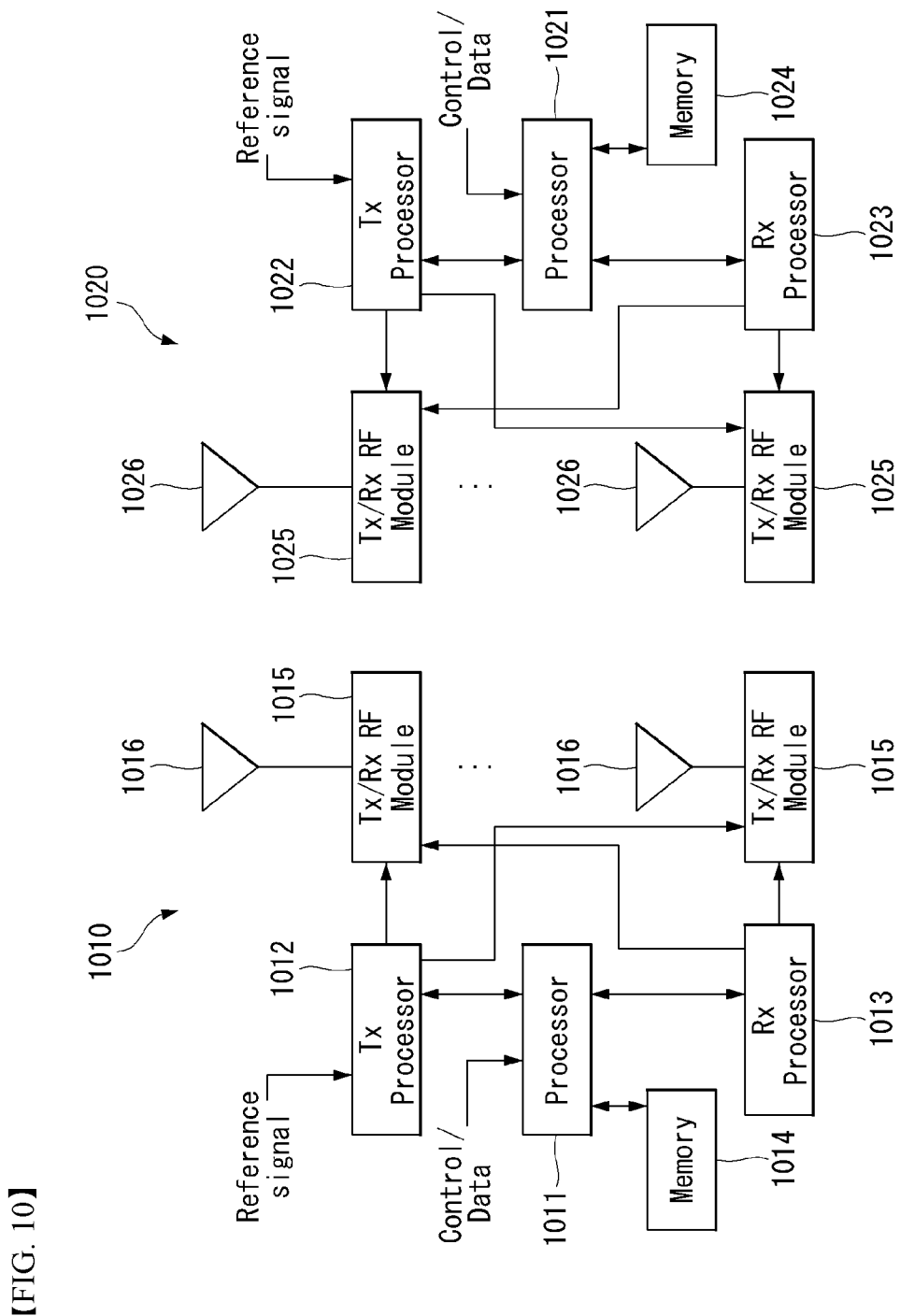

[FIG. 11]
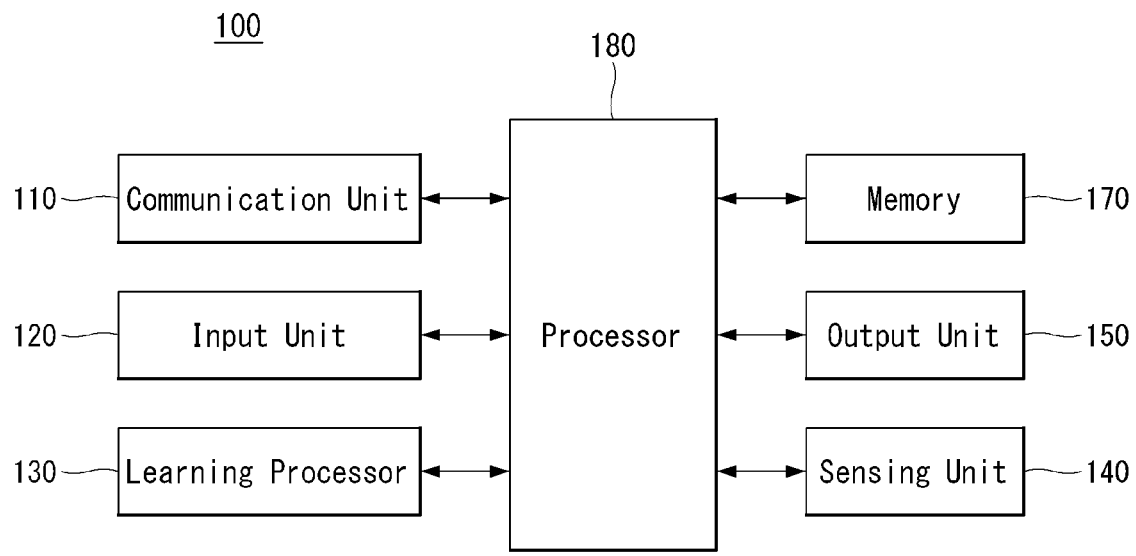
[FIG. 12]
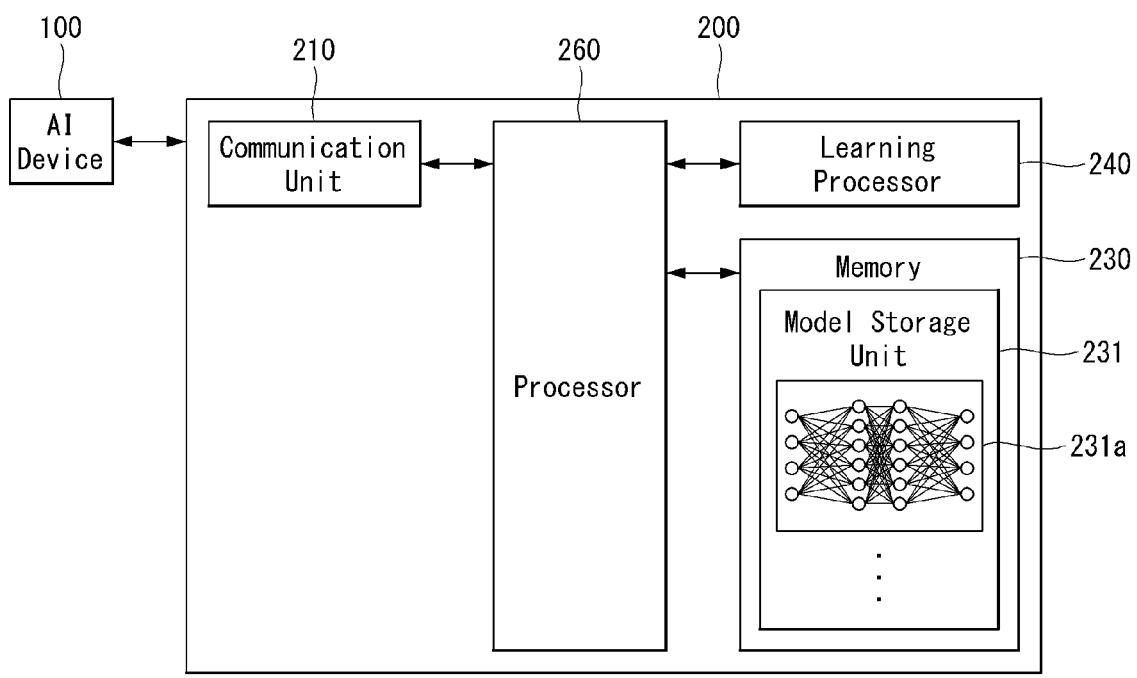

【FIG. 13】
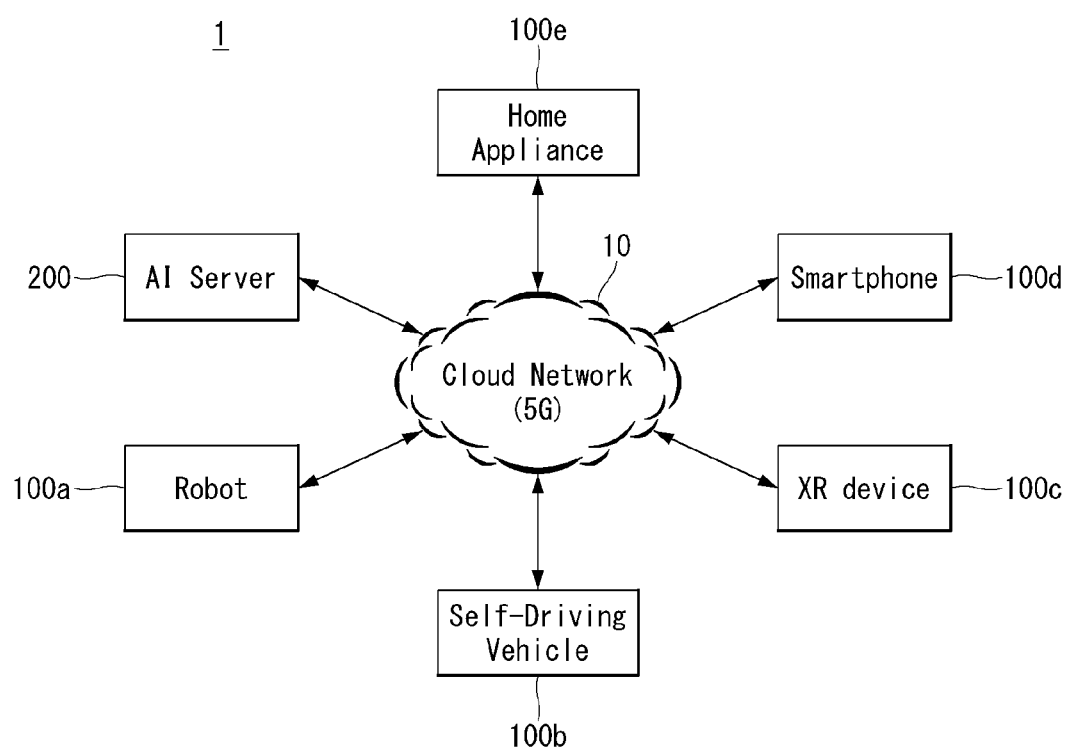

METHOD FOR TRANSMITTING AND RECEIVING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/009965, filed on Aug. 8, 2019, which claims the benefit of Korean Application No. 10-2018-0092564, filed on Aug. 8, 2018, the contents of which are all hereby incorporated by reference herein in their entirety.

TECHNICAL FIELD

The present disclosure generally relates to a wireless communication system, and more specifically, to transmission and reception of channel state information.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

Embodiments of the present disclosure enable transmission and reception of channel state information (CSI).

Technical Solution

A method for transmitting channel state information (CSI) by a terminal via a plurality of physical uplink control channels (PUCCHs) in a wireless communication system according to an embodiment of the present disclosure, the method includes receiving, from a base station, configuration information related to a CSI reporting; transmitting first CSI information to the base station via a first PUCCH resource; and transmitting second CSI information to the base station via a second PUCCH resource. Wherein the terminal may support a plurality of beams, the first CSI information may be CSI information related to a first beam set among the plurality of beams, and the second CSI information may be CSI information related to a second set excluding the first set among the plurality of beams.

In addition, in the method according to an embodiment of the present disclosure, when a number of beams in the first beam set is 1, the first CSI information may be based on a type 1 codebook, and the second CSI information may be based on a type 2 codebook.

In addition, in the method according to an embodiment of the present disclosure, the first CSI information and the second CSI information may be based on a linear combination codebook.

In addition, in the method according to an embodiment of the present disclosure, the second CSI information may be calculated by applying a CSI parameter included in the first CSI information.

In addition, in the method according to an embodiment of the present disclosure, the CSI parameter may be at least one of a CSI-reference signal (RS) resource indicator (CRI), a rank indicator (RI), and/or a precoding matrix indicator (PMI).

In addition, in the method according to an embodiment of the present disclosure, when a value of the rank indicator (RI) included in the first CSI information is different from a value of the rank indicator included in the second CSI information, the CSI parameter may not be applied to the calculation of the second CSI information.

In addition, the method according to an embodiment of the present disclosure may further include transmitting information indicating whether the second CSI information is calculated by applying the CSI parameter included in the first CSI information via the second PUCCH resource.

In addition, in the method according to an embodiment of the present disclosure, the first PUCCH resource may be allocated for wideband CSI information, and, the second PUCCH resource may be allocated for subband CSI information.

In addition, in the method according to an embodiment of the present disclosure, the subband CSI information may include a subband linear combination (LC) coefficient for the first beam set and a subband linear combination coefficient for the second beam set.

In addition, in the method according to an embodiment of the present disclosure, a number of OFDM symbols of the first PUCCH resource may be smaller than a number of OFDM symbols of the second PUCCH resource.

In addition, the method according to an embodiment of the present disclosure may further include transmitting a specific beam index for each of the first PUCCH resource and the second PUCCH resource to the base station.

A terminal for transmitting channel state information (CSI) via a plurality of physical uplink control channels (PUCCHs) in a wireless communication system according to an embodiment of the present disclosure, the terminal may include a radio frequency (RF) unit, at least one processor, and at least one memory functionally connected to the at least one processor. Wherein when the memory is executed by the at least one processor, the memory may store instructions for performing operations of: receiving, from a base station, configuration information related to a CSI reporting using the RF unit; transmitting first CSI information to the base station via a first PUCCH resource using the RF unit; and transmitting second CSI information to the base station via a second PUCCH resource using the RF unit. In addition, the terminal may support a plurality of beams, the first CSI information may be CSI information related to a first beam set among the plurality of beams, and the second CSI information may be CSI information related to a second set excluding the first set among the plurality of beams.

In addition, in the terminal according to an embodiment of the present disclosure, when a number of beams in the first beam set is 1, the first CSI information may be based on a type 1 codebook, and the second CSI information may be based on a type 2 codebook.

In addition, in the terminal according to an embodiment of the present disclosure, the first CSI information and the second CSI information may be based on a linear combination codebook.

In addition, in the terminal according to an embodiment of the present disclosure, the second CSI information may be calculated by applying a CSI parameter included in the first CSI information.

Advantageous Effects

According to an embodiment of the present disclosure, in a channel state information (CSI) reporting, there is an effect of efficiently transmitting and receiving CSI information even when the size and/or granularity of the codebook is high.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 illustrates an example of an overall structure of an NR system according to some embodiments of the present disclosure.

FIG. 2 illustrates the relation between an uplink frame and a downlink frame in a wireless communication system according to some embodiments of the present disclosure.

FIG. 3 illustrates an example of a frame structure in a NR system.

FIG. 4 illustrates an example of a resource grid supported in a wireless communication system according to some embodiments of the present disclosure.

FIG. 5 illustrates examples of a resource grid per antenna port and numerology according to some embodiments of the present disclosure.

FIG. 6 shows an example of a self-contained structure according to some embodiments of the present disclosure.

FIG. 7 illustrates a flowchart of an operation of a terminal transmitting channel state information (CSI) via a plurality of physical uplink control channels (PUCCHs) in a wireless communication system proposed in the present disclosure.

FIG. 8 illustrates a flowchart of an operation of a base station receiving channel state information (CSI) via a plurality of physical uplink control channels (PUCCHs) in a wireless communication system proposed in the present disclosure.

FIG. 9 illustrates a wireless communication device according to some embodiments of the present disclosure.

FIG. 10 illustrates another example of the block diagram of the wireless communication device according to some embodiments of the present disclosure.

FIG. 11 illustrates an AI device 100 according to an embodiment of the present disclosure.

FIG. 12 illustrates an AI server 200 according to an embodiment of the present disclosure.

FIG. 13 illustrates an AI system 1 according to an embodiment of the present disclosure.

MODE FOR INVENTION

Embodiments of the present disclosure generally enable transmission and reception of channel state information (CSI) in a wireless communication system.

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a robot, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system according to some embodiments of the disclosure.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defied by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |

TABLE 1-continued

| μ | Δf = $2^μ \cdot 15$ [kHz] | Cyclic prefix |
|---|---|---|
| 3 | 120 | Normal |
| 4 | 240 | Normal |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates the relation between an uplink frame and a downlink frame in a wireless communication system according to some embodiments of the disclosure.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $$n_s^μ \in \{0, \ldots, N_{subfram}^{slots,μ} - 1\}$$

within a subframe and are numbered in increasing order of $$n_{s,f}^μ \in \{0, \ldots, N_{frame}^{slots,μ} - 1\}$$

within a radio frame. One slot consists of consecutive OFDM symbols of $N_{symb}^μ$, and $N_{symb}^μ$ is determined depending on a numerology used and slot configuration. The start of slots $n_s^μ$ in a subframe is aligned in time with the start of OFDM symbols $n_s^μ N_{symb}^μ$ in the same subframe.

Not all UEs are able to transmit and receive at the same time, and this means that not all OFDM symbols in a downlink slot or an uplink slot are available to be used.

Table 2 represents the number $N_{symb}^{slot}$ of OFDM symbols per slot, the number $N_{slot}^{frame, μ}$ of slots per radio frame, and the number $N_{slot}^{subframe, μ}$ of slots per subframe in a normal CP. Table 3 represents the number of OFDM symbols per slot, the number of slots per radio frame, and the number of slots per subframe in an extended CP.

TABLE 2

| μ | $N_{symb}^{slot}$ | $N_{slot}^{frame, μ}$ | $N_{slot}^{subframe, μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, μ}$ | $N_{slot}^{subframe, μ}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure. In Table 3, in case of μ=2, i.e., as an example in which a subcarrier spacing (SCS) is 60 kHz, one subframe (or frame) may include four slots with reference to Table 2, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system according to some embodiments of the disclosure.

Referring to FIG. 4, a resource grid consists of $N_{RB}^μ N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max, μ}$. $N_{RB}^{max, μ}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology according to some embodiments of the disclosure.

Each element of the resource grid for the numerology μ and the antenna port p is called a resource element and is uniquely identified by an index pair (k, l), where k=0, . . . , $N_{RB}^μ N_{sc}^{RB}-1$ is an index on a frequency domain, and l=0, . . . , $2^μ N_{symb}^{(μ)}-1$ refers to a location of a symbol in a subframe. The index pair (k, l) is used to refer to a resource element in a slot, where l=0, . . . , $N_{symb}^μ-1$.

The resource element (k,l) for the numerology μ and the antenna port p corresponds to a complex value $a_{k,l}^{(p,μ)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Self-Contained Structure

A time division duplexing (TDD) structure taken into consideration in an NR system is a structure in which both uplink (UL) and downlink (DL) are processed in one slot (or subframe). This is for minimizing latency of data transmission in the TDD system. The structure may be referred to as a self-contained structure or a self-contained slot.

FIG. 6 shows an example of a self-contained structure according to some embodiments of the disclosure. FIG. 6 is merely for convenience of description and does not limit the scope of the present disclosure.

Referring to FIG. 6, as in the case of legacy LTE, a case where one transmission unit (e.g., slot, subframe) is configured with 14 orthogonal frequency division multiplexing (OFDM) symbols is assumed.

In FIG. 6, a region 602 means a downlink control region, and a region 604 means an uplink control region. Furthermore, regions (i.e., regions not having separate indication) except the region 602 and the region 604 may be used for the transmission of downlink data or uplink data.

That is, uplink control information and downlink control information may be transmitted in one self-contained slot. In contrast, in the case of data, uplink data or downlink data may be transmitted in one self-contained slot.

If the structure shown in FIG. 6 is used, downlink transmission and uplink transmission are sequentially performed and the transmission of downlink data and the reception of uplink ACK/NACK may be performed within one self-contained slot.

Consequently, when an error occurs in data transmission, the time consumed up to the retransmission of data can be reduced. Accordingly, latency related to data forwarding can be minimized.

In a self-contained slot structure, such as FIG. 6, there is a need for a time gap for a process of a base station (eNodeB, eNB, gNB) and/or a terminal (user equipment (UE)) changing from a transmission mode to a reception mode or of the base station and/or the terminal changing from a reception mode to a transmission mode. In relation to the time gap, when uplink transmission is performed after downlink transmission in a self-contained slot, some OFDM symbol(s) may be configured as a guard period (GP).

The present disclosure proposes a method for transmitting and receiving channel state information in an NR system.

In the case of the NR system, not only a type 1 codebook but also a type 2 codebook may be additionally supported for sophisticated CSI feedback. For example, the type 1 codebook may be for general CSI feedback, and the type 2 codebook may be for high-level CSI feedback (e.g. CSI feedback targeting MU-MIMO). That is, the type 2 codebook has a larger codebook size and more sophisticated than the type 1 codebook. Therefore, in the case of the type 2 codebook, the feedback payload is large, and as a result, more PUSCH resources may be required for CSI feedback based on the type 2 codebook.

Hereinafter, when considering a codebook that can be applied in the NR system (e.g. a type 1 codebook, a type 2 codebook, etc.), a method of indicating, by the base station, a type of the codebook and/or information included in a specific codebook (hereinafter, a first embodiment and a second embodiment) and a method of performing CSI feedback via a plurality of PUCCH resources in consideration of the payload of CSI feedback, etc. (hereinafter, a third embodiment) are proposed.

It goes without saying that embodiments to be described below are only classified for convenience of description, and some elements of one embodiment may be substituted with some elements of other embodiments or may be combined with each other and applied.

First Embodiment

In the present embodiment, a method in which the base station indicates the terminal to perform CSI feedback (i.e. CSI reporting) through a certain level of sophisticated codebook considering a trade-off between the PUSCH resource and the performance (i.e. sophistication) of the codebook will be described.

In particular, the present embodiment proposes a method in which the base station indicates a codebook to be used (or applied) to the CSI feedback of the terminal via an explicit method.

For example, the base station may trigger a specific reporting setting (i.e. CSI reporting setting), that is, a CSI reporting, for the terminal via downlink control information (DCI). The target triggered by the DCI may be an aperiodic CSI reporting (AP CSI reporting) or a semi-persistent CSI reporting (SP CSI reporting).

When the target triggered by the DCI is the aperiodic CSI reporting, the terminal may perform the aperiodic CSI reporting using resources (i.e. resource allocation information) allocated via the DCI. On the other hand, when the target triggered by the DCI is the semi-persistent CSI reporting, the terminal may perform the semi-persistent CSI reporting via semi-persistently allocated resources.

In this case, the base station may indicate not only the CSI reporting setting using the DCI, but also the granularity and/or sophistication degree of the codebook to be reported by the terminal. The corresponding terminal may calculate CSI using the codebook indicated by the base station, and may report the calculated CSI to the base station.

The granularity of the codebook may mean selecting either the type 1 codebook or the type 2 codebook. Alternatively, the granularity of the codebook may mean selection of various parameter values that determine the granularity of the type 2 codebook within the type 2 codebook.

For example, in the type 2 codebook, the size and/or granularity of the codebook may be determined by various values as follows.

Number (L) of beams in linear combination (LC)

Number (K) of beams to which sophisticated LC coefficients used in subband (SB) CSI reporting are applied Set of amplitude components among LC coefficients (e.g. first set={1, 0.5, 0}, second set={1, 0.5, 0.25, . . . , 0})

Set of phase components among LC coefficients (e.g. first set=QPSK (Quadrature Phase-Shift Keying), second set=8PSK)

Codebook mode (e.g. Mode 1 or Mode 2 depending on whether SB amplitude reporting is possible)

The base station may indicate and/or set information on the size and/or granularity of the codebook based on the above-described parameter value(s) to the terminal via signaling of a hierarchical structure.

When candidate values for the above-described parameter values are configured (or designated) via higher layer signaling (e.g. radio resource control (RRC) signaling, medium access control (MAC) layer signaling, etc.), the base station may indicate specific parameter value(s) from among the configured (or designated) candidate values to the terminal via the DCI. Alternatively, in consideration of DCI overhead, the base station may indicate information on the size and/or granularity of the codebook via the MAC layer signaling to the terminal.

In addition, the terminal may periodically or a periodically report information on the size and/or granularity of the codebook which is preferred by the terminal to the base station. In this case, the reporting may be performed via an uplink channel such as PUCCH and/or PUSCH. The base station receiving the reporting may indicate a codebook to be used by the corresponding terminal for CSI feedback (i.e. CSI reporting) referring to the value reported by the terminal. In other words, the base station may determine and/or indicate information on the size and/or granularity of the codebook to be used by the corresponding terminal based on the information on the preferred codebook of the corresponding terminal reported from the terminal.

Second Embodiment

Unlike the first embodiment described above, the present embodiment proposes a method of indicating, by the base station, a codebook to be used (or applied) to the CSI feedback of the terminal through an implicit method.

For example, the base station may trigger a specific reporting setting (i.e. CSI reporting setting), that is, a CSI reporting, for the terminal via the DCI. At the same time, the base station may indicate information on PUSCH resource allocation for which the CSI reporting is to be performed. At this time, according to the size of the PUSCH resource allocated for the CSI reporting, the terminal may (self) determine the size and/or granularity of the codebook, and report a precoding matrix indicator (PMI) with the largest size and/or the highest granularity within a range not exceeding the allocated PUSCH resource.

In other words, the terminal may determine the size and/or granularity of the codebook to be used for the CSI reporting based on the size of the resources allocated by the base station in relation to the CSI reporting. That is, information on the size and/or granularity of the codebook to be used for the CSI reporting by the terminal may be implicitly indicated or set based on the size of the resources allocated to the CSI reporting.

As a specific example, when the PUSCH resource allocated for the CSI reporting is 100RB (resource block), the terminal may generate (or determine) a PMI using a codebook having high granularity, and report the generated (or determined) PMI to the base station. On the other hand, when the PUSCH resource allocated for the CSI reporting is 20RB, the terminal may generate (or determine) a PMI using a codebook having low granularity, and report the generated (or determined) PMI to the base station.

The base station may transmit information on a codebook parameter value for determining the codebook having high granularity and the codebook having low granularity to the terminal via the higher layer signaling (e.g. RRC signaling, MAC layer signaling, etc.). Alternatively, without separate signaling, the terminal may use a predetermined (or defined) value in relation to the information on the codebook parameter value.

When the terminal adjusts the codebook parameter (e.g. L, K, amplitude component set, phase component set, codebook mode, etc.) to determine the granularity that can be transmitted in the PUSCH resource by itself, and performs the CSI reporting (e.g. PMI reporting) via this, it may be necessary to determine an order of which parameter values are sequentially decreased. That is, when a limited PUSCH resource is allocated to the CSI reporting by the base station, priorities for parameters to be reported via the limited PUSCH resource may be configured. In the order of parameters having a lower priority, they may be excluded from the CSI reporting to be transmitted via the limited PUSCH resource.

As an example, the terminal may adjust the value of the corresponding parameter in the order of L, K, amplitude component set, phase component set, codebook mode, and type 1 codebook. That is, if the overhead is large even though the parameter values of the type 2 codebook are adjusted, the terminal may perform the CSI reporting (e.g. PMI reporting) using the type 1 codebook. The terminal may determine a codebook that can be transmitted via the PUSCH resource allocated by the base station while adjusting the parameter values, generate (or determine) the PMI using the corresponding codebook, and report the generated (or determined) PMI to the base station.

In addition, the CSI may be multiplexed and reported together with other uplink data (e.g. UL-SCH, etc.) and/or other uplink control information (e.g. HARQ-ACK information, etc.). In this case, the terminal may exclude resources used for the other uplink data and/or the other control information, and may need to determine a codebook that can be transmitted via the remaining resources.

In addition, when the size of the PUSCH resource allocated for the CSI reporting is smaller than all preset codebook candidates, the terminal may select the granularity and/or type of a codebook capable of transmitting (or reporting) by omitting the smallest amount of CSI.

Third Embodiment

As the size of the codebook increases, it may be difficult to report all CSIs via one PUCCH resource when the CSI is fed back via a PUCCH resource having a relatively small capacity. As an example, one PUCCH resource may mean a specific PUCCH resource unit allocated to the terminal.

In particular, in the case of subband (SB) CSI feedback (i.e. subband CSI reporting), the payload of CSI feedback may increase because PMI and CQI for each subband must be reported, and the corresponding CSI feedback may be difficult to be transmitted via one PUCCH resource.

In consideration of this point, the present embodiment proposes a method of dividing and transmitting the CSI via the plurality of PUCCH resources when the codebook size is large (e.g. type 2 codebook, subband CSI feedback, etc.). The plurality of PUCCH resources may be located and transmitted within one slot, or may be divided into a plurality of slots and transmitted with a specific period.

In the NR system, when using a linear combination (LC) codebook, a method of transmitting LC coefficients (e.g. amplitude component coefficient, phase component coefficient) of some M beams among L beams that are linearly combined via a first PUCCH (1st PUCCH), and then transmitting LC coefficients of the remaining L-M beams via a second PUCCH (2nd PUCCH) may be considered.

Via the first PUCCH, not only the PMI but also the remaining CSI information that can be achieved when the PMI is used (e.g. CSI-RS Resource Indicator (CRI), Rank Indicator (RI), Layer Indicator (LI)), non-zero beam indicator (NZBI), CQI, etc.) and other parameters for which LC codebook generation is used (e.g. beam group and beam selection information within the group, etc.) may be transmitted together. In addition, via the second PUCCH, not only information on the LC coefficients of the remaining beam(s) but also information on the CQI that can be achieved when the CRI and/or RI of the first PUCCH is applied and the remaining beam(s) are additionally linearly combined to the PMI of the first PUCCH may be transmitted.

That is, the terminal may transmit CSI with low sophistication (i.e. low resolution) via the first PUCCH, and may transmit CSI that refines the CSI in the first PUCCH via the second PUCCH. The base station may perform scheduling using less sophisticated CSI based on the CSI in the first PUCCH after receiving the first PUCCH and before receiving the second PUCCH. After receiving the second PUCCH, the base station may perform scheduling using sophisticated CSI.

Further, in the above-described operation, M may be set to 1. That is, the terminal may report CSI for one beam via the first PUCCH, and may report CSI for the remaining beam(s) except for the one beam via the second PUCCH. In other words, since M=1, the terminal may transmit (or feed back) a codebook that does not perform linear combination (LC) in the first PUCCH. In addition, since information on the remaining LC beams and coefficients is transmitted in the second PUCCH, the terminal may transmit (or feed back) a codebook for performing linear combination in the second PUCCH. This may be interpreted as a hybrid codebook transmission scheme in which the terminal feeds back the type 1 codebook in the first PUCCH and the type 2 codebook in the second PUCCH.

Hereinafter, as described above, methods that can be additionally applied when the CSI reporting is divided and performed via the plurality of PUCCH resources will be described. It goes without saying that the methods to be described below are only classified for convenience of description, and some elements of one method may be substituted with some elements of other methods or may be combined with each other and applied.

Method 3-1)

A rank indicator (RI) value transmitted (or reported) by the terminal in the first PUCCH and an RI value transmitted in the second PUCCH may be different. That is, a case in which the rank value transmitted in the first PUCCH and the rank value transmitted in the second PUCCH are different may occur.

When the RI value transmitted in the second PUCCH is different from the RI value transmitted in the first PUCCH, the CSI in the second PUCCH may be set not to be calculated and/or used for the purpose of refining the CSI in the first PUCCH. In this case, the CSI in the second PUCCH may be calculated and/or interpreted as the CSI in the new first PUCCH. Conversely, when the RI value transmitted in the second PUCCH is the same as the RI value transmitted in the first PUCCH, the CSI in the second PUCCH may be calculated and/or used for the purpose of refining the CSI in the first PUCCH.

In addition, when the RI value transmitted in the second PUCCH is 0, the CSI in the corresponding second PUCCH may be calculated and/or used for the purpose of refining the CSI in the first PUCCH. In this case, the terminal may follow the RI value of the first PUCCH.

Alternatively, the terminal may transmit information (e.g. flag information) on whether the CSI in the second PUCCH is calculated and/or used for the purpose of refining the CSI in the second PUCCH to the base station together with the second PUCCH. Through this, the terminal may report to the base station whether to refine the CSI via a fragment PUCCH or to treat it as an independent PUCCH CSI.

Method 3-2)

In addition, a method of configuring the first PUCCH to be used for reporting only wideband (WB) CSI information and the second PUCCH to be used for reporting subband (SB) CSI information derived by referring to the wideband CSI in the first PUCCH may be considered. When the subband CSI information cannot be transmitted to the second PUCCH at once, some subband CSI information may be divided and transmitted (or transferred) via N second PUCCHs. In addition, the N second PUCCHs may be transmitted at once at the same time, or may be transmitted at a different time with a specific period.

For example, the entire subband may be divided into N comb structures, and the terminal may transmit subband CSI corresponding to each comb structure via each second PUCCH. The subband CSI information may include information on subband LC coefficients corresponding to the M beams reported in the first PUCCH and information on subband LC coefficients corresponding to the L-M beams. In addition, the subband CSI information may include subband CQI.

The first PUCCH for reporting wideband CSI information may be transmitted via a short (and/or long) PUCCH because the payload size is not large, and the second PUCCH for reporting the subband CSI information may be transmitted via a long PUCCH because the payload size is large.

Alternatively, some subband CSI information may be transmitted together with wide band CSI to the first PUCCH. For example, in the N comb structures (i.e. N comb subband structures), the terminal may transmit the subband CSI information corresponding to a specific comb (e.g. a first comb) together in the first PUCCH, and transmit the subband CSI information corresponding to the remaining combs in the second PUCCH. Alternatively, the terminal may report the subband CSI information and the wideband CSI information corresponding to a specific comb using the first PUCCH, and may report all subband CSI information (that is, subband CSI information transmitted in the first PUCCH is also included) in the second PUCCH.

Method 3-3)

In addition, the terminal may report the strongest beam index in each PUCCH, that is, the index of the beam having the best performance among the reported beams, to the base station. The strongest beam index (i.e. the index of the beam having the best performance among the reported beams) may be reported in the second PUCCH, and the strongest beam index in the second PUCCH may be different from the strongest beam index transmitted in the first PUCCH. In this case, the strongest beam index transmitted in the first PUCCH may be meaningless, and the strongest beam index transmitted in the second PUCCH may have meaning. That is, the strongest beam index reported via the PUCCH transmitted later may be interpreted as valid information. Hereinafter, the corresponding method will be described in detail.

For example, when the RI value reported in the first PUCCH is r, the terminal may report the strongest beam index for each of r layers. When the RI value is 2, the terminal may report the strongest beam index of each of a first layer and a second layer as (1, 2). Here, (x, y) represents the strongest beam index x in the first layer and the strongest beam index y in the second layer. In this case, when the terminal reports the strongest beam index in the second PUCCH as (1, 3), the corresponding terminal may generate (or determine) a codebook by assuming a first beam (i.e. beam index 1) as the strongest beam since the strongest beam index is equal to 1 for the first layer. In contrast, for the second layer, since the strongest beam index has been changed from 2 to 3, the corresponding terminal may generate (or determine) a codebook by assuming a third beam (i.e. beam index 3) to be linearly combined (LC) as the strongest beam. In this case, a second beam (i.e. beam index 2) no longer corresponds to the strongest beam, and the LC coefficient to be applied to the second beam must be reported together in the second PUCCH.

If the strongest beam index (e.g. beam index 3) reported (updated) in the second PUCCH is one of the L-M beams reported in the second PUCCH, the terminal may generate (or determine) a codebook by applying the LC coefficient corresponding to the strongest beam index reported in the second PUCCH to the strongest beam index before the change (i.e. outdated strongest beam index) (e.g. beam index 2).

If the strongest beam index (e.g. beam index 3) reported (updated) in the second PUCCH is one of the M beams reported in the first PUCCH, the terminal needs to additionally report an LC coefficient to be applied to the strongest beam index (i.e. outdated strongest beam index) (e.g. beam index 2) before the change in the second PUCCH. In order to prevent such additional reporting, it may be promised in advance that the LC coefficient of the strongest beam index (i.e. outdated strongest beam index) before the change reported in the first PUCCH and the LC coefficient of the updated strongest beam index are exchanged and applied.

FIG. 7 illustrates a flowchart of an operation of a terminal transmitting channel state information (CSI) via a plurality of physical uplink control channels (PUCCHs) in a wireless communication system proposed in the present disclosure. FIG. 7 is only for convenience of description and does not limit the scope of the present disclosure.

Referring to FIG. 7, a terminal and/or a base station may transmit and receive CSI based on the above-described embodiments and methods. For example, as in the above-described third embodiment, the terminal may divide and transmit CSI information to the base station via a plurality of PUCCH resources. In addition, it is assumed that the terminal supports a plurality of beams.

The terminal may receive, from the base station, configuration information related to CSI reporting (S705). For example, as described above, the configuration information may include information on parameter(s) for determining (or generating) a codebook related to transmission and reception of the CSI information. For example, the information on the parameter(s) may include the number of beams to be linearly combined (LC) (L), the number of beams to which a sophisticated LC coefficient used in subband CSI reporting is applied (K), a set of amplitude components among the LC coefficients, a set of phase components among the LC coefficients, and information on a codebook mode (e.g. a candidate value).

For example, an operation in which the terminal (e.g. 920 in FIG. 9, 1020 in FIG. 10) in step S705 described above receives the configuration information from the base station (e.g. 910 in FIG. 9, 1010 in FIG. 10) may be implemented by devices of FIGS. 9 to 13 to be described below. For example, referring to FIG. 9, one or more processors 921 may control one or more transceivers 923 and/or one or more memories 922 to receive the configuration information, and one or more transceivers 923 may receive the configuration information from the base station.

The terminal may transmit first CSI information to the base station via a first PUCCH resource (S710). In addition, the terminal may transmit second CSI information to the base station via a second PUCCH resource (S715). For example, as described above, the terminal may divide and transmit (or report) the CSI information to the base station via the plurality of PUCCH resources. In this case, the first CSI information and the second CSI information may be determined (or calculated) based on the received configuration information.

In addition, the terminal may support the plurality of beams (e.g. L beams) (for transmitting and receiving signals and/or channels with the base station). In this case, the first CSI information may be CSI information related to a first beam set (e.g. M beams) among the plurality of beams, and the second CSI information may be CSI information related to a second beam set (e.g. L-M beams) among the plurality of beams.

For example, an operation in which the terminal (e.g. 920 in FIG. 9, 1020 in FIG. 10) in steps S710 and S715 described above transmits the first CSI information and the second CSI information to the base station (e.g. 910 in FIG. 9, 1010 in FIG. 10) may be implemented by devices of FIGS. 9 to 13 to be described below. For example, referring to FIG. 9, one or more processors 921 may control one or more transceivers 923 and/or one or more memories 922 to transmit the first CSI information and the second CSI information, and one or more transceivers 923 may transmit the first CSI information and the second CSI information to the base station.

In addition, as described above, when the number of beams in the first beam set is 1, the first CSI information may be based on a type 1 codebook, and the second CSI information may be based on a type 2 codebook.

In addition, as described above, the first CSI information and the second CSI information may be based on a linear combination codebook.

In this case, the second CSI information may be calculated by applying a CSI parameter included in the first CSI information. That is, as an example, the second CSI information may be for refining the first CSI information. The CSI parameter may be at least one of a CSI-reference signal (RS) resource indicator (CRI), a rank indicator (RI), and/or a precoding matrix indicator (PMI).

In addition, as described above, when a value of the rank indicator (RI) included in the first CSI information is different from a value of the rank indicator included in the second CSI information, the CSI parameter may not be applied to the calculation of the second CSI information.

In addition, as described above, the terminal may transmit information indicating whether the second CSI information is calculated by applying the CSI parameter included in the first CSI information to the base station via the second PUCCH resource.

In addition, as described above, the first PUCCH resource may be allocated for wideband CSI information, and the second PUCCH resource may be allocated for subband CSI information. Here, the subband CSI information may include a subband linear combination (LC) coefficient for the first beam set and a subband linear combination coefficient for the second beam set. In addition, the number of OFDM symbols of the first PUCCH resource may be smaller than the number of OFDM symbols of the second PUCCH resource. As an example, the first PUCCH resource may be based on a short PUCCH format, and the second PUCCH resource may be based on a long PUCCH format.

In addition, as described above, the terminal may transmit a specific beam index (e.g. strongest beam index) for each of the first PUCCH resource and the second PUCCH resource to the base station.

FIG. 8 illustrates a flowchart of an operation of a base station receiving channel state information (CSI) via a plurality of physical uplink control channels (PUCCHs) in a wireless communication system proposed in the present disclosure. FIG. 8 is only for convenience of description and does not limit the scope of the present disclosure.

Referring to FIG. 8, a terminal and/or a base station may transmit and receive CSI based on the above-described embodiments and methods. For example, as in the above-described third embodiment, the base station may receive divided CSI information from the terminal via a plurality of PUCCH resources. In addition, it is assumed that the terminal supports a plurality of beams.

The base station may transmit, to the terminal, configuration information related to CSI reporting (S805). For example, as described above, the configuration information may include information on parameter(s) for determining (or generating) a codebook related to transmission and reception of the CSI information. For example, the information on the parameter(s) may include the number of beams to be linearly combined (LC) (L), the number of beams to which a sophisticated LC coefficient used in subband CSI reporting is applied (K), a set of amplitude components among the LC coefficients, a set of phase components among the LC coefficients, and information on a codebook mode (e.g. a candidate value).

For example, an operation in which the base station (e.g. 910 in FIG. 9, 1010 in FIG. 10) in step S805 described above transmits the configuration information to the terminal (e.g. 920 in FIG. 9, 1020 in FIG. 10) may be implemented by devices of FIGS. 9 to 13 to be described below. For example, referring to FIG. 9, one or more processors 911 may control one or more transceivers 913 and/or one or more memories 912 to transmit the configuration information, and one or more transceivers 913 may transmit the configuration information to the terminal.

The base station may receive first CSI information from the terminal via a first PUCCH resource (S810). In addition, the base station may receive second CSI information from the terminal via a second PUCCH resource (S815). For example, as described above, the base station may receive (or be reported) the divided CSI information from the terminal via the plurality of PUCCH resources. In this case, the first CSI information and the second CSI information may be determined (or calculated) based on the received configuration information.

In addition, the terminal may support the plurality of beams (e.g. L beams) (for transmitting and receiving signals and/or channels with the base station). In this case, the first CSI information may be CSI information related to a first beam set (e.g. M beams) among the plurality of beams, and the second CSI information may be CSI information related to a second beam set (e.g. L-M beams) among the plurality of beams.

For example, an operation in which the base station (e.g. 910 in FIG. 9, 1010 in FIG. 10) in steps S810 and S815 described above receives the first CSI information and the second CSI information from the terminal (e.g. 920 in FIG. 9, 1020 in FIG. 10) may be implemented by devices of FIGS. 9 to 13 to be described below. For example, referring to FIG. 9, one or more processors 911 may control one or more transceivers 913 and/or one or more memories 912 to receive the first CSI information and the second CSI information, and one or more transceivers 913 may receive the first CSI information and the second CSI information from the terminal.

In addition, as described above, when the number of beams in the first beam set is 1, the first CSI information may be based on a type 1 codebook, and the second CSI information may be based on a type 2 codebook.

In addition, as described above, the first CSI information and the second CSI information may be based on a linear combination codebook.

In this case, the second CSI information may be calculated by applying a CSI parameter included in the first CSI information. That is, as an example, the second CSI information may be for refining the first CSI information. The CSI parameter may be at least one of a CSI-reference signal (RS) resource indicator (CRI), a rank indicator (RI), and/or a precoding matrix indicator (PMI).

In addition, as described above, when a value of the rank indicator (RI) included in the first CSI information is different from a value of the rank indicator included in the second CSI information, the CSI parameter may not be applied to the calculation of the second CSI information.

In addition, as described above, the base station may receive information indicating whether the second CSI information is calculated by applying the CSI parameter included in the first CSI information from the terminal via the second PUCCH resource.

In addition, as described above, the first PUCCH resource may be allocated for wideband CSI information, and the second PUCCH resource may be allocated for subband CSI information. Here, the subband CSI information may include a subband linear combination (LC) coefficient for the first beam set and a subband linear combination coefficient for the second beam set. In addition, the number of OFDM symbols of the first PUCCH resource may be smaller than the number of OFDM symbols of the second PUCCH resource. As an example, the first PUCCH resource may be based on a short PUCCH format, and the second PUCCH resource may be based on a long PUCCH format.

In addition, as described above, the base station may receive a specific beam index (e.g. strongest beam index) for each of the first PUCCH resource and the second PUCCH resource from the terminal.

Overview of Devices to which Present Disclosure is Applicable

FIG. 9 illustrates a wireless communication device according to some embodiments of the disclosure.

Referring to FIG. 9, a wireless communication system may include a first device 910 and a second device 920.

The first device 910 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

The second device 920 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a pin-tec device (or financial device), a security device, a climate/environmental device, devices related to 5G services, or other devices related to fourth industrial revolution fields.

For example, the UE may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 910 may include at least one processor, such as a processor 911, at least one memory, such as a memory 912, and at least one transceiver, such as a transceiver 913. The processor 911 may perform the functions, procedures, and/or methods described above. The processor 911 may perform one or more protocols. The processor 911 may perform one or more layers of a radio interface protocol. The memory 912 may be connected to the processor 911 and store various types of information and/or commands. The transceiver 913 may be connected to the processor 911 and controlled to transmit/receive a radio signal.

The second device 920 may include at least one processor, such as a processor 921, at least one memory, such as a memory 922, and at least one transceiver, such as a transceiver 923. The processor 921 may perform the functions, procedures, and/or methods described above. The processor 921 may implement one or more protocols. For example, the processor 921 may implement one or more layers of the radio interface protocol. The memory 922 may be connected to the processor 921 and store various types of information and/or commands. The transceiver 923 may be connected to the processor 921 and controlled to transmit/receive a radio signal.

The memory 912 and/or the memory 922 may be connected inside or outside the processor 911 and/or the processor 921, respectively, and may be connected to other processors through various technologies such as wired or wireless connection.

The first device 910 and/or the second device 920 may have one or more antennas. For example, antenna 914 and/or antenna 924 may be configured to transmit and receive wireless signals.

FIG. 10 illustrates another example of the block diagram of the wireless communication device according to some embodiments of the disclosure.

Referring to FIG. 10, a wireless communication system includes an eNB 1010 and multiple user equipments 1020 positioned within an area of the eNB. The eNB may be represented by a transmitting apparatus and the UE may be represented by a receiving apparatus, or vice versa. The eNB and the UE include processors (1011,1021), memories (1014,1024), one or more Tx/Rx radio frequency (RF) modules (1015,1025), Tx processors (1012,1022), Rx processors (1013, 1023) and antennas (1016, 1026). The processor implements a function, a process, and/or a method which are described above. More specifically, a higher layer packet from a core network is provided to the processor 1011 in DL (communication from the eNB to the UE). The processor implements a function of an L2 layer. In the DL, the processor provides multiplexing between a logical channel and a transmission channel and allocation of radio resources to the UE 1020, and takes charge of signaling to the UE. The transmit (TX) processor 1012 implement various signal processing functions for an L1 layer (i.e., physical layer). The signal processing functions facilitate forward error correction (FEC) at the UE and include coding and interleaving. Encoded and modulated symbols are divided into parallel streams, each stream is mapped to an OFDM subcarrier, multiplexed with a reference signal (RS) in a time and/or frequency domain, and combined together by using inverse fast Fourier transform (IFFT) to create a physical channel carrying a time domain OFDMA symbol stream. An OFDM stream is spatially precoded in order to create multiple spatial streams. Respective spatial streams may be provided to different antennas 1016 via individual Tx/Rx modules (or transceivers, 1015). Each Tx/Rx module may modulate an RF carrier into each spatial stream for transmission. In the UE, each Tx/Rx module (or transceiver, 1025) receives a signal through each antenna 1026 of each Tx/Rx module. Each Tx/Rx module reconstructs information modulated with the RF carrier and provides the reconstructed information to the receive (RX) processor 1023. The RX processor implements various signal processing functions of layer 1. The RX processor may perform spatial processing on information in order to reconstruct an arbitrary spatial stream which is directed for the UE. When multiple spatial streams are directed to the UE, the multiple spatial streams may be combined into a single OFDMA symbol stream by multiple RX processors. The RX processor transforms the OFDMA symbol stream from the time domain to the frequency domain by using fast Fourier transform (FFT). A frequency domain signal includes individual OFDMA symbol streams for respective subcarriers of the OFDM signal. Symbols on the respective subcarriers and the reference signal are reconstructed and demodulated by determining most likely signal arrangement points transmitted by the eNB. The soft decisions may be based on channel estimation values. The soft decisions are decoded and deinterleaved to reconstruct data and control signals originally transmitted by the eNB on the physical channel. The corresponding data and control signals are provided to the processor 1021.

UL (communication from the UE to the eNB) is processed by the eNB 1010 in a scheme similar to a scheme described in association with a receiver function in the UE 1020. Each Tx/Rx module 1025 receives the signal through each antenna 1026. Each Tx/Rx module provides the RF carrier and information to the RX processor 1023. The processor 1021 may be associated with the memory 1024 storing a program code and data. The memory may be referred to as a computer readable medium.

FIG. 11 illustrates an AI device 100 according to an embodiment of the present disclosure.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 11, the terminal 100 may include a communication unit 110, an input unit 120, a learning processor 130, a sensing unit 140, an output unit 150, a memory 170 and a processor 180.

The communication unit 110 may transmit and receive data to and from external devices, such as other AI devices 100a to 100e or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 180 may control at least some of the elements of the AI device 100 in order to execute an application program stored in the memory 170. Moreover, the processor 180 may combine and drive two or more of the elements included in the AI device 100 in order to execute the application program.

FIG. 12 illustrates an AI server 200 according to an embodiment of the present disclosure.

Referring to FIG. 12, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, a memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231*a*) which is being trained or has been trained through the learning processor 240.

The learning processor 240 may train the artificial neural network 231*a* using learning data. The learning model may be used in the state in which it has been mounted on the AI server 200 or the artificial neural network may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

FIG. 13 illustrates an AI system 1 according to an embodiment of the present disclosure.

Referring to FIG. 13, the AI system 1 is connected to at least one of the AI server 200, a robot 100*a*, a self-driving vehicle 100*b*, an XR device 100*c*, a smartphone 100*d* or home appliances 100*e* over a cloud network 10. In this case, the robot 100*a*, the self-driving vehicle 100*b*, the XR device 100*c*, the smartphone 100*d* or the home appliances 100*e* to which the AI technology has been applied may be called AI devices 100*a* to 100*e*.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100*a* to 100*e* (200) configuring the AI system 1 may be interconnected over the cloud network 10. Particularly, the devices 100*a* to 100*e* and 200 may communicate with each other through a base station, but may directly communicate with each other without the intervention of a base station.

The AI server 200 may include a server for performing AI processing and a server for performing calculation on big data.

The AI server 200 is connected to at least one of the robot 100*a*, the self-driving vehicle 100*b*, the XR device 100*c*, the smartphone 100*d* or the home appliances 100*e*, that is, AI devices configuring the AI system 1, over the cloud network 10, and may help at least some of the AI processing of the connected AI devices 100*a* to 100*e*.

In this case, the AI server 200 may train an artificial neural network based on a machine learning algorithm in place of the AI devices 100*a* to 100*e*, may directly store a learning model or may transmit the learning model to the AI devices 100*a* to 100*e*.

In this case, the AI server 200 may receive input data from the AI devices 100*a* to 100*e*, may deduce a result value of the received input data using the learning model, may generate a response or control command based on the deduced result value, and may transmit the response or control command to the AI devices 100*a* to 100*e*.

Alternatively, the AI devices 100*a* to 100*e* may directly deduce a result value of input data using a learning model, and may generate a response or control command based on the deduced result value.

Hereinafter, various embodiments of the AI devices 100*a* to 100*e* to which the above-described technology is applied are described. In this case, the AI devices 100*a* to 100*e* shown in FIG. 13 may be considered to be detailed embodiments of the AI device 100 shown in FIG. 11.

<AI and Robot to which the Methods Proposed in this Disclosure May be Applied>

An AI technology is applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

<AI and Self-Driving to which the Methods Proposed in this Disclosure May be Applied>

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

<AI and XR to which the Methods Proposed in this Disclosure May be Applied>

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100*c* may perform the above operations using a learning model configured with at least one artificial neural network. For example, the XR device 100*c* may recognize a real object in three-dimensional point cloud data or image data using a learning model, and may provide information corresponding to the recognized real object. In this case, the learning model may have been directly trained in the XR device 100*c* or may have been trained in an external device, such as the AI server 200.

In this case, the XR device 100*c* may directly generate results using a learning model and perform an operation, but may perform an operation by transmitting sensor information to an external device, such as the AI server 200, and receiving results generated in response thereto.

<AI, Robot and Self-Driving to which the Methods Proposed in this Disclosure May be Applied>

An AI technology and a self-driving technology are applied to the robot 100*a*, and the robot 100*a* may be implemented as a guidance robot, a transport robot, a cleaning robot, a wearable robot, an entertainment robot, a pet robot, an unmanned flight robot, etc.

The robot 100*a* to which the AI technology and the self-driving technology have been applied may mean a robot itself having a self-driving function or may mean the robot 100*a* interacting with the self-driving vehicle 100*b*.

The robot 100*a* having the self-driving function may collectively refer to devices that autonomously move along a given flow without control of a user or autonomously determine a flow and move.

The robot 100*a* and the self-driving vehicle 100*b* having the self-driving function may use a common sensing method in order to determine one or more of a moving path or a running plan. For example, the robot 100*a* and the self-driving vehicle 100*b* having the self-driving function may determine one or more of a moving path or a running plan using information sensed through LIDAR, a radar, a camera, etc.

The robot 100*a* interacting with the self-driving vehicle 100*b* is present separately from the self-driving vehicle 100*b*, and may perform an operation associated with a self-driving function inside or outside the self-driving vehicle 100*b* or associated with a user got in the self-driving vehicle 100*b*.

In this case, the robot 100*a* interacting with the self-driving vehicle 100*b* may control or assist the self-driving function of the self-driving vehicle 100*b* by obtaining sensor information in place of the self-driving vehicle 100*b* and providing the sensor information to the self-driving vehicle 100*b*, or by obtaining sensor information, generating surrounding environment information or object information, and providing the surrounding environment information or object information to the self-driving vehicle 100*b*.

Alternatively, the robot 100*a* interacting with the self-driving vehicle 100*b* may control the function of the self-driving vehicle 100*b* by monitoring a user got in the self-driving vehicle 100*b* or through an interaction with a user. For example, if a driver is determined to be a drowsiness state, the robot 100*a* may activate the self-driving function of the self-driving vehicle 100*b* or assist control of the driving unit of the self-driving vehicle 100*b*. In this case, the function of the self-driving vehicle 100*b* controlled by the robot 100*a* may include a function provided by a navigation system or audio system provided within the self-driving vehicle 100*b*, in addition to a self-driving function simply.

Alternatively, the robot 100*a* interacting with the self-driving vehicle 100*b* may provide information to the self-driving vehicle 100*b* or may assist a function outside the self-driving vehicle 100*b*. For example, the robot 100*a* may provide the self-driving vehicle 100*b* with traffic information, including signal information, as in a smart traffic light, and may automatically connect an electric charger to a filling inlet through an interaction with the self-driving vehicle 100*b* as in the automatic electric charger of an electric vehicle.

<AI, Robot and XR to which the Methods Proposed in this Disclosure May be Applied>

An AI technology and an XR technology are applied to the robot 100*a*, and the robot 100*a* may be implemented as a guidance robot, a transport robot, a cleaning robot, a wearable robot, an entertainment robot, a pet robot, an unmanned flight robot, a drone, etc.

The robot 100*a* to which the XR technology has been applied may mean a robot, that is, a target of control/interaction within an XR image. In this case, the robot 100*a* is different from the XR device 100*c*, and they may operate in conjunction with each other.

When the robot 100*a*, that is, a target of control/interaction within an XR image, obtains sensor information from sensors including a camera, the robot 100*a* or the XR device 100*c* may generate an XR image based on the sensor information, and the XR device 100*c* may output the generated XR image. Furthermore, the robot 100*a* may operate based on a control signal received through the XR device 100*c* or a user's interaction.

For example, a user may identify a corresponding XR image at timing of the robot 100*a*, remotely operating in conjunction through an external device, such as the XR device 100*c*, may adjust the self-driving path of the robot 100*a* through an interaction, may control an operation or driving, or may identify information of a surrounding object.

<AI, Self-Driving and XR to which the Methods Proposed in this Disclosure May be Applied>

An AI technology and an XR technology are applied to the self-driving vehicle 100*b*, and the self-driving vehicle 100*b* may be implemented as a movable type robot, a vehicle, an unmanned flight body, etc.

The self-driving vehicle 100*b* to which the XR technology has been applied may mean a self-driving vehicle equipped with means for providing an XR image or a self-driving vehicle, that is, a target of control/interaction within an XR image. Particularly, the self-driving vehicle 100*b*, that is, a target of control/interaction within an XR image, is different from the XR device 100*c*, and they may operate in conjunction with each other.

The self-driving vehicle 100*b* equipped with the means for providing an XR image may obtain sensor information from sensors including a camera, and may output an XR image generated based on the obtained sensor information. For example, the self-driving vehicle 100*b* includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100*b*, at least some of the XR object may be output so that it overlaps an object within a screen. For example, the self-driving vehicle 100*b* may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

A wireless device in the disclosure may be a base station, a network node, a transmitting terminal, a receiving terminal, a wireless device, a wireless communication device, a vehicle, a vehicle equipped with an autonomous driving function, a unmanned aerial vehicle, UAV), an Artificial Intelligence (AI) module, a robot, an Augmented Reality (AR) device, a Virtual Reality (VR) device, an MTC device, an IoT device, a medical device, a pin-tec device (or financial device), a security device, a climate/environmental device, devices related to 5G services, or other devices related to fourth industrial revolution fields. For example, the UAV may be a flying object that is not ridden by people but that flies by radio control signals. For example, the MTC device and the IoT device are devices that do not require direct human intervention or manipulation, and may be a smart meter, a vending machine, a thermometer, a smart light bulb, a door lock, and various sensors, etc. For example, the medical device is a device used for the purpose of diagnosing, treating, alleviating, curing or preventing a disease or a device used for the purpose of testing, replacing or modifying a function or structure, and may be equipment for treatment, a device for surgery, a device for (extracorporeal) diagnosis, a hearing aid, or a device for treatment, etc. For example, the security device is a device installed to prevent dangers that may occur and to maintain safety, and may be a camera, CCTV, or a black box, etc. For example, the fintech device is a device that can provide financial services such as mobile payment, and may be a payment device, a point of sales (POS), etc. For example, the climate/environment device may mean a device that monitors and predicts the climate/environment.

The UE in the disclosure may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), foldable device etc. For example, the HMD may be a display device worn on a head and may be used to implement the VR or AR.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to a specific claim may be combined with another claim referring to the claims other than the specific claim to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

Although a method for transmitting and receiving channel state information in a wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:

1. A method for transmitting, by a terminal supporting a plurality of linearly combined beams, channel state information (CSI) via a plurality of physical uplink control channels (PUCCHs) in a wireless communication system, the method comprising:

receiving, from a base station, configuration information related to a CSI reporting;

transmitting, to the base station via a first PUCCH, first CSI including a precoding matrix indicator (PMI) and a rank indicator (RI), remaining CSI which can be achieved with the PMI, parameters for which linear combination (LC) codebook generation is used, and LC coefficients of a first beam set among the plurality of linearly combined beams; and transmitting, to the base station via a second PUCCH, second CSI including channel quality information (CQI) which can be achieved based on the RI of the first CSI applied and a second beam set additionally linearly combined to the PMI of the first CSI, and LC coefficients of the second beam set excluding the first beam set among the plurality of linearly combined beams, wherein a number of orthogonal frequency division multiplexing (OFDM) symbols for the second PUCCH is larger than a number of OFDM symbols for the first PUCCH, the first PUCCH is based on a short PUCCH format, and the second PUCCH is based on a long PUCCH format, wherein the first PUCCH and the second PUCCH include strongest beam indices for each of layers indicated by the RI, wherein, in case a strongest beam index for a layer is different in the first PUCCH and the second PUCCH, a strongest beam index for a layer in the second PUCCH is used for a codebook generation.

2. The method of claim 1, wherein when a number of beams in the first beam set is 1, the first CSI is based on a type 1 codebook, and the second CSI is based on a type 2 codebook.

3. The method of claim 1, wherein the first CSI and the second CSI are based on the linear combination codebook.

4. The method of claim 3, wherein the second CSI is calculated by applying a CSI parameter included in the first CSI.

5. The method of claim 4, wherein the CSI parameter is at least one of a CSI-reference signal (RS) resource indicator (CRI), a rank indicator (RI), or a precoding matrix indicator (PMI).

6. The method of claim 4, wherein when a value of the rank indicator (RI) included in the first CSI is different from a value of a RI included in the second CSI, the CSI parameter is not applied to the calculation of the second CSI.

7. The method of claim 4, further comprising:
transmitting information indicating whether the second CSI is calculated by applying the CSI parameter included in the first CSI via the second PUCCH.

8. The method of claim 3, wherein the first PUCCH is allocated for wideband CSI, and, the second PUCCH is allocated for subband CSI.

9. The method of claim 8, wherein the subband CSI includes a subband linear combination (LC) coefficient for the first beam set and a subband linear combination coefficient for the second beam set.

10. The method of claim 3, further comprising:
transmitting a specific beam index for each of the first PUCCH and the second PUCCH to the base station.

11. A terminal supporting a plurality of linearly combined beams for transmitting channel state information (CSI) via a plurality of physical uplink control channels (PUCCHs) in a wireless communication system, the terminal comprising:
a transceiver,
at least one processor, and
at least one memory connected to the at least one processor and storing instructions that, based on being executed by the at least one processor, perform operations comprising:
receiving, from a base station, configuration information related to a CSI reporting;
transmitting, to the base station via a first PUCCH using the transceiver, first CSI including a precoding matrix indicator (PMI) and a rank indicator (RI), remaining CSI which can be achieved with the PMI, parameters for which linear combination (LC) codebook generation is used, and LC coefficients of a first beam set among the plurality of linearly combined beams; and
transmitting, to the base station via a second PUCCH using the transceiver, second CSI including channel quality information (CQI) which can be achieved based on the RI of the first CSI applied and a second beam set additionally linearly combined to the PMI of the first CSI, and LC coefficients of the second beam set excluding the first beam set among the plurality of linearly combined beams,
wherein a number of orthogonal frequency division multiplexing (OFDM) symbols for the second PUCCH is larger than a number of OFDM symbols for the first PUCCH, the first PUCCH is based on a short PUCCH format, and the second PUCCH is based on a long PUCCH format,
wherein the first PUCCH and the second PUCCH include strongest beam indices for each of layers indicated by the RI,
wherein, in case a strongest beam index for a layer is different in the first PUCCH and the second PUCCH, a strongest beam index for a layer in the second PUCCH is used for a codebook generation.

12. The terminal of claim 1, wherein when a number of beams in the first beam set is 1, the first CSI is based on a type 1 codebook, and the second CSI is based on a type 2 codebook.

13. The terminal of claim 11, wherein the first CSI and the second CSI are based on the linear combination codebook.

14. The terminal of claim 13, wherein the second CSI is calculated by applying a CSI parameter included in the first CSI.

* * * * *